US007640231B2

(12) United States Patent
Alvarez et al.

(10) Patent No.: US 7,640,231 B2
(45) Date of Patent: Dec. 29, 2009

(54) APPROACH BASED ON SELF-EVOLVING MODELS FOR PERFORMANCE GUARANTEES IN A SHARED STORAGE SYSTEM

(75) Inventors: Guillermo A. Alvarez, San Jose, CA (US); John D. Palmer, San Jose, CA (US); Sandeep M. Uttamchandani, San Jose, CA (US); Li Yin, Albany, CA (US)

(73) Assignee: International Business Machines Corporation, Armonk, NY (US)

( * ) Notice: Subject to any disclaimer, the term of this patent is extended or adjusted under 35 U.S.C. 154(b) by 197 days.

(21) Appl. No.: 11/280,012

(22) Filed: Nov. 16, 2005

(65) Prior Publication Data

US 2007/0112723 A1     May 17, 2007

(51) Int. Cl.
*G06F 7/00* (2006.01)
(52) U.S. Cl. .......................................................... 707/2
(58) Field of Classification Search ...................... 707/2
See application file for complete search history.

(56) References Cited

U.S. PATENT DOCUMENTS

| | | | |
|---|---|---|---|
| 6,459,682 B1 | 10/2002 | Ellesson et al. | |
| 6,640,248 B1 | 10/2003 | Jorgensen | |
| 2002/0049608 A1* | 4/2002 | Hartsell et al. | 705/1 |
| 2002/0120741 A1* | 8/2002 | Webb et al. | 709/225 |
| 2002/0152305 A1* | 10/2002 | Jackson et al. | 709/224 |
| 2003/0046396 A1* | 3/2003 | Richter et al. | 709/226 |
| 2003/0117958 A1 | 6/2003 | Nation et al. | |
| 2003/0120764 A1 | 6/2003 | Laye et al. | |
| 2003/0208510 A1 | 11/2003 | Doyle et al. | |

OTHER PUBLICATIONS

Fischer et al., "Decision Support for Cooperative QoS Management," IEEE, 1998, p. 247-255.
Ben-Shahar et al., "Best Effort Resource Sharing By Users With Qos Requirements," IEEE, 1999, p. 883-890.
Matsui et al., "An Extensible Object Model for QoS Specification in Adaptive QoS Systems," Faculty of Environmental Information, Keio University, 4 pages.
Uttamchandani, et al., "Decision QoS: An Adaptive, Self-Evolving QoS Arbitration Module for Storage Systems," IEEE Computer Society, 2004, 10 pages.

\* cited by examiner

*Primary Examiner*—Charles Rones
*Assistant Examiner*—Fazlul Quader
(74) *Attorney, Agent, or Firm*—Gibb I.P. Law Firm, LLC (57) ABSTRACT

A technique of allocating shared resources in a computer network-based storage system comprises taking periodic performance samples on a running storage system; evaluating an objective function that takes as input the performance samples to quantify how aligned a current state of the storage system is with organizational objectives; building and maintaining models of behavior and capabilities of the storage system by using the performance samples as input; determining how resources of the storage system should be allocated among client computers in the storage system by selecting one among many possible allocations based on predictions generated by the models in order to maximize a value of the objective function; calculating a confidence statistic value for a chosen resource allocation based on an accuracy of the models; and enforcing the chosen resource allocation on the running storage system when the confidence statistic value is at or above a predetermined threshold value.

25 Claims, 10 Drawing Sheets

APPROACH BASED ON SELF-EVOLVING MODELS FOR PERFORMANCE GUARANTEES IN A SHARED STORAGE SYSTEM

BACKGROUND

1. Field of the Invention

The embodiments herein generally relate to computer storage systems, and, more particularly, to techniques for allocating resources in a computer network-based storage system.

2. Description of the Related Art

Enterprise applications typically depend on guaranteed performance from the storage subsystem, lest they fail. However, unregulated competition is generally unlikely to result in a fair, predictable apportioning of resources. Given that widespread access protocols and scheduling policies are largely best-effort, the problem of providing performance guarantees on a shared system is a very difficult one. Clients typically lack accurate information on the storage system's capabilities and on the access patterns of the workloads using it, thereby compounding the problem.

A typical consolidated storage system at the multi-petabyte level generally serves the needs of independent, paying customers (e.g., a storage service provider) or divisions within the same organization (e.g., a corporate data center). Consolidation has generally proven to be an effective remedy for the low utilizations that plague storage systems, for the expense of employing scarce system administrators, and for the dispersion of related data into unconnected islands of storage. However, the ensuing resource contention generally makes it more difficult to guarantee a portion of the shared resources to each client, regardless of whether other clients over- or under-utilize their allocations-guarantees typically required by the prevalent utility model.

The industry has identified the problem of allocating resources in a fully automated, cost-efficient way so that most clients experience predictable performance in their accesses to a shared, large-scale storage utility. Hardware costs play a dwindling role relative to managing costs in most conventional enterprise systems. However, input/output (I/O) workloads are highly bursty: the load placed on the storage subsystem can change by two orders of magnitude in a matter of milliseconds. Therefore, it is not practical to provision for the worst case-since all applications accessing the system will seldom have their peak loads at the same point in time, worst-case designs will have excessive amounts of unused resources that can cost millions of dollars to purchase and administer. This problem is compounded by inadequate available knowledge about storage device capabilities. Also, there is a tradeoff between how resource-efficient a design is, and how easy it will be for it to adapt to unforeseen (but unavoidable) circumstances in the future. In the state of the art, carefully hand-crafted static allocations generally do not contemplate hardware failures, load surges, and workload variations; system administrators must typically deal with those by hand, as part of a slow and error-prone observe-act-analyze loop. Prevalent access protocols (e.g., SCSI and FibreChannel) and resource scheduling policies are largely best-effort. Accordingly, unregulated competition is generally unlikely to result in a fair, predictable resource allocation.

Previous work on this problem includes management policies encoded as sets of rules. Fully specifying corrective actions at design time is an error-prone solution to a highly complex problem, especially if they are to cover a useful fraction of the solution space and to accommodate priorities. It is also typically difficult to determine accurate threshold values that will lead to correct decisions in different scenarios, in the absence of any solid quantitative information about the system being built. Other approaches include heuristic-based scheduling of individual I/Os and decisions based purely on feedback loops and on the predictions of models for system components. The resulting solutions are generally either not adaptive at all (as in the case of rules), or dependent on models that are too costly to develop, or ignorant of the system's performance characteristics as observed during its lifetime. Accordingly, there remains a need for an improved technique that allocates resources in a computer network in a fully automated and cost-efficient manner.

SUMMARY

In view of the foregoing, embodiments herein provide a computer-implemented method of allocating shared resources in a computer network-based storage system, and a program storage device readable by a computer, tangibly embodying a program of instructions executable by the computer to perform computer-implemented method of allocating shared resources in a computer network-based storage system, wherein the method comprises taking periodic performance samples on a running computer network-based storage system; evaluating an objective function that takes as input the performance samples to quantify how aligned a current state of the computer network-based storage system is with organizational objectives; building and maintaining models of behavior and capabilities of the computer network-based storage system by using the performance samples as input; determining how resources of the computer network-based storage system should be allocated among client computers in the computer network-based storage system by selecting one among many possible allocations based on predictions generated by the models in order to maximize a value of the objective function; calculating a confidence statistic value for a chosen resource allocation based on an accuracy of the models; and enforcing the chosen resource allocation on the running computer network-based storage system when the confidence statistic value is at or above a predetermined threshold value.

The method may further comprise maintaining a predetermined set of system designer-defined policies for allocating the resources among the client computers; and using the set of system designer-defined policies to allocate the resources among the client computers so long as the confidence statistic value fails to reach the predetermined threshold value. Preferably, a Service Level Agreement (SLA) is associated to at least partially some of the client computers that specifies a performance that each associated client computer expects to experience in exchange for respecting specified bounds on a load the client computer imposes on the computer network-based storage system, and wherein a value of the objective function depends on which SLAs are being violated.

Moreover, at least one client computer with an associated SLA is preferably assigned a priority such that the objective function incorporates the priority to prefer system states in which the SLAs of the client computers with higher priorities are satisfied. Furthermore, the models may comprise data relating to capabilities of individual components in the computer network-based storage system; characteristics of a workload presented to the components; and an expected response from the workloads to changes in the amount of system resources available to the workloads. Additionally, the performance samples are preferably used to improve an accuracy of the models in a periodic and fully-automatic manner, and to determine when variable system conditions have caused a discontinuous change in the behavior of the computer network-based storage system.

Incremental model refinement may be accomplished starting from any of a model built by taking performance samples from the computer network-based storage system in a non-production use; a model built by taking performance samples from the computer network-based storage system in a production use while models are not being used to allocate resources; and a simplified representation of a behavior of the computer network-based storage system. Preferably, a determination of an allocation of system resources among competing client computers is made by solving a constrained optimization problem.

The method may further comprise allocating additional resources to at least one particular client computer when a SLA requirement of the particular client computer is being insufficiently met, wherein the allocating of additional resources to the particular client computer preferably occurs by reducing an amount of resources provided to another one of the client computers, and reallocating the resources to the particular client computer, and wherein the reducing an amount of resources provided to another one of the client computers preferably occurs by throttling workloads of competing client computers. Also, the method may further comprise computing a rate at which each workload stream for the client computers should be allowed to issue inputs/outputs (I/Os) to the computer network-based storage system.

The method may further comprise for each component used by the particular client computer having an underperforming workload, using the model to determine a change in a request rate at the component of a storage component in the computer network-based storage system required to make the underperforming workload reach a sufficient level of performance; querying the model for each workload using the component to determine which change in an input/output (I/O) injection rate of the workload is necessary to relieve a load of the component; and determining a token issue rate necessary for a desired change in the injection rate, wherein transitions between current workload token issue rates and lower token issue rates are preferably enforced progressively in steps whose size depends on the confidence statistical value. Additionally, the method may further comprise reassessing token issue rates depending on a change in the load of the component. Furthermore, the method may comprise analyzing a current state of performance of the computer network system after a predetermined number of throttling steps, wherein token issue rates for one or more the client computers are preferably increased by unthrottling their workloads when system resources become available.

Another embodiment provides a computer-implemented system for allocating shared resources in a computer network-based storage system comprising means for taking periodic performance samples on a running computer network-based storage system; means for evaluating an objective function that takes as input the performance samples to quantify how aligned a current state of the computer network-based storage system is with organizational objectives; means for building and maintaining models of behavior and capabilities of the computer network-based storage system by using the performance samples as input; means for determining how resources of the computer network-based storage system should be allocated among client computers in the computer network-based storage system by selecting one among many possible allocations based on predictions generated by the models in order to maximize a value of the objective function; means for calculating a confidence statistic value for a chosen resource allocation based on an accuracy of the models; and means for enforcing the chosen resource allocation on the running computer network-based storage system when the confidence statistic value is at or above a predetermined threshold value.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION OF PREFERRED EMBODIMENTS

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned, there remains a need for an improved technique that allocates resources in a computer network in a fully automated and cost-efficient manner. The embodiments herein achieve this by providing an adaptive technique for providing performance guarantees in shared storage systems based on a combination of performance models, constrained optimization, and incremental feedback. Referring now to the drawings, and more particularly to FIGS. 1 through 10, there are shown preferred embodiments.

Figure 1:
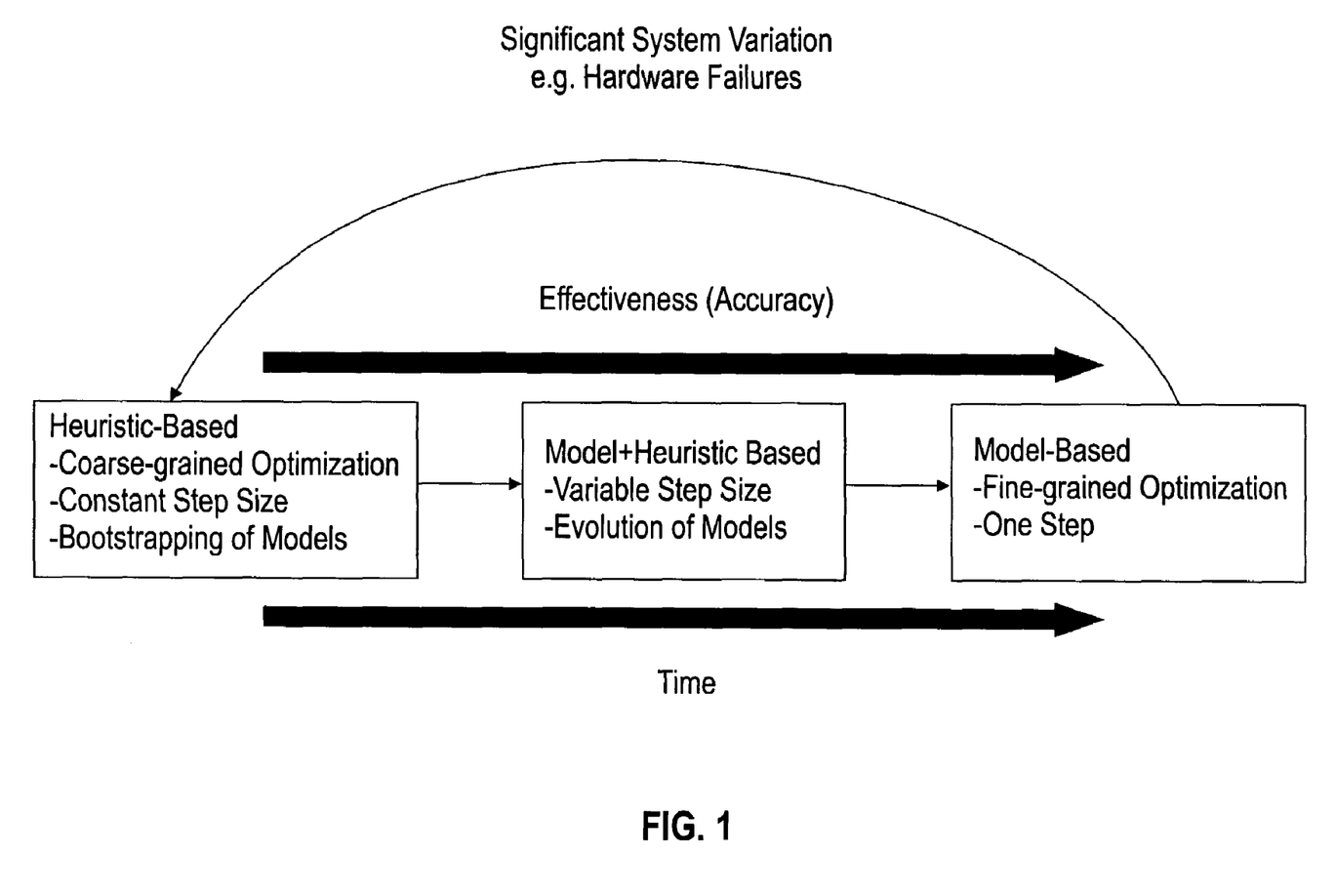
FIG. 1 illustrates a schematic diagram of an implementation of the embodiments herein.

The embodiments herein provide a framework in which clients whose negotiated Service Level Agreement (SLAs)

are not being met are allowed access to additional resources freed up by throttling (i.e., rate-limiting) competing clients. The embodiments herein make more accurate throttling decisions as they learn more about the characteristics of the running system, and of the workloads being presented to them. As shown in FIG. 1, the embodiments herein operate at any point in a continuum between decisions made based on relatively uninformed, deployment-independent heuristics at one extreme, and blind obedience to models of the particular system being managed at the opposite extreme.

The embodiments herein can react to workload changes in a nimble manner, resulting in a marginal number of quality of service (QoS) violations. The embodiments herein are capable of finding the set of throttling decisions that yields the maximum value of the optimization function, while minimizing the amount of throttling required to meet the targets and while maximizing the number of clients whose QoS requirements were satisfied. Since the approach provided by the embodiments herein does not depend on pre-existing device or workload models, it can be easily deployed on heterogeneous, large-scale storage systems about which little is known.

Figure 2:
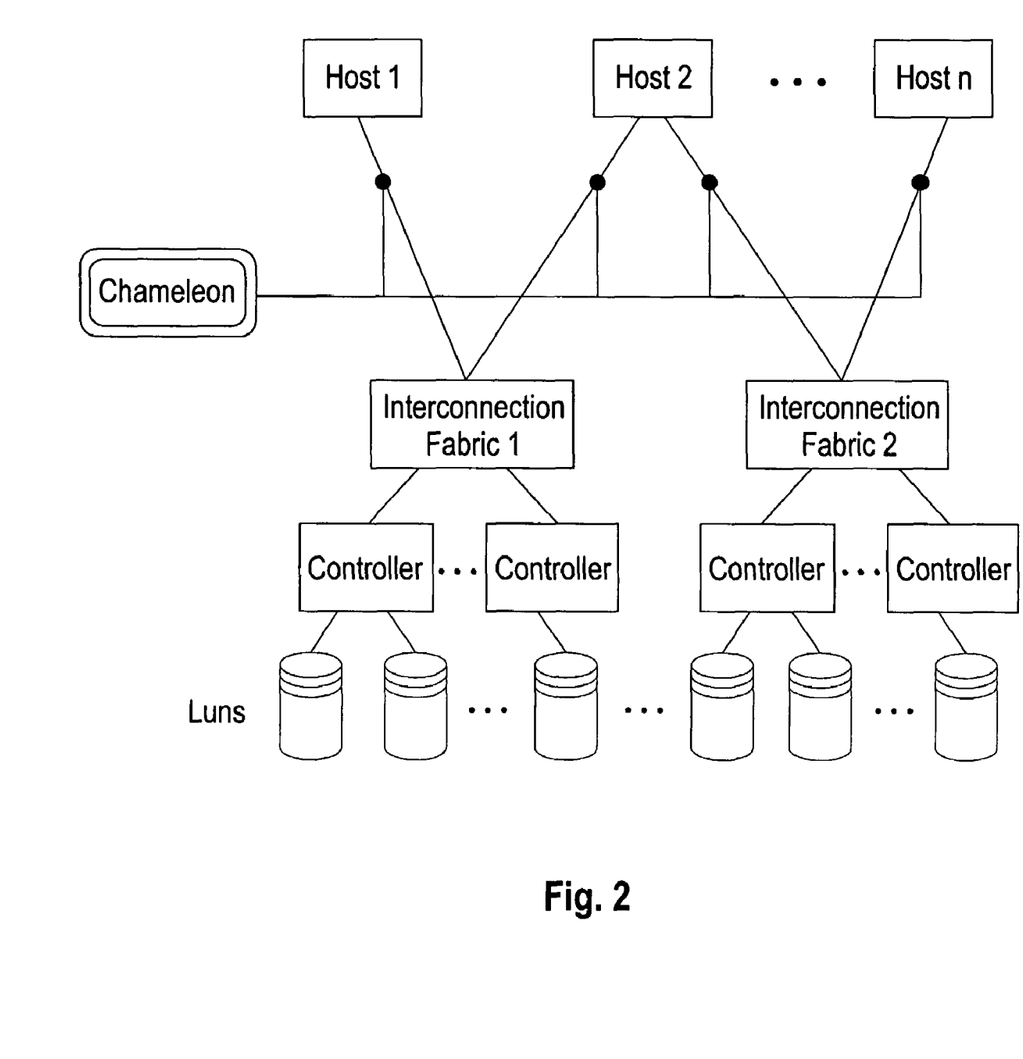
FIG. 2 illustrates a system diagram according to an embodiment herein.

As mentioned, the embodiments herein, which is referred to as "Chameleon", provide a framework for providing predictable performance to multiple clients accessing a common storage infrastructure, as shown in FIG. 2. Multiple hosts connect to storage devices in the storage back end via interconnection fabrics. The embodiments herein need to be able to monitor, and optionally delay, every I/O processed by the system. These monitoring and control capabilities can be implemented by modifying device drivers on each host, or at logical volume managers, or at block-level virtualization appliances. Each workload j has a known $SLA_j$ associated with it, and uses a fixed set of components (referred to as its "invocation path"), such as controllers, logical volumes, switches, and logical units (LUNs). When SLAs are not being met, the embodiments herein identify and throttle workloads; when they detect unused bandwidth, they unthrottle some of the previously-throttled workloads.

In the present formulation of the resource arbitration problem, SLAs are conditional: a workload will be guaranteed a specified upper bound on average I/O latency as long as its I/O rate (i.e., the throughput), measured as either or both of I/Os per second (IOPS) and bytes per second (B/s) is below a specified limit. The embodiments herein use IOPS as the sole throughput metric for SLAs, on the understanding that any person skilled in the art could readily use B/s instead, or both. An SLA is violated if the rate is below the limit, but latency exceeds its upper bound. If workloads exceed their stated limits on throughput, the system is under no obligation of guaranteeing any latency. Obviously, such rogue workloads are prime candidates for throttling; but in some extreme cases, well-behaved workloads may also need to be restricted. The embodiments herein periodically evaluate the SLA for each workload, i.e., its average latency and throughput values; depending on how much the workload is being throttled, it receives tokens (each of them giving it the ability to issue one I/O to the back end) for flow control using a leaky bucket protocol. The periodic interval for SLA evaluation should preferably be large enough to smooth out bursts, and small enough for the system to be reasonably responsive; this interval is empirically set to 60 seconds in one implementation of the embodiments herein.

Figure 3:
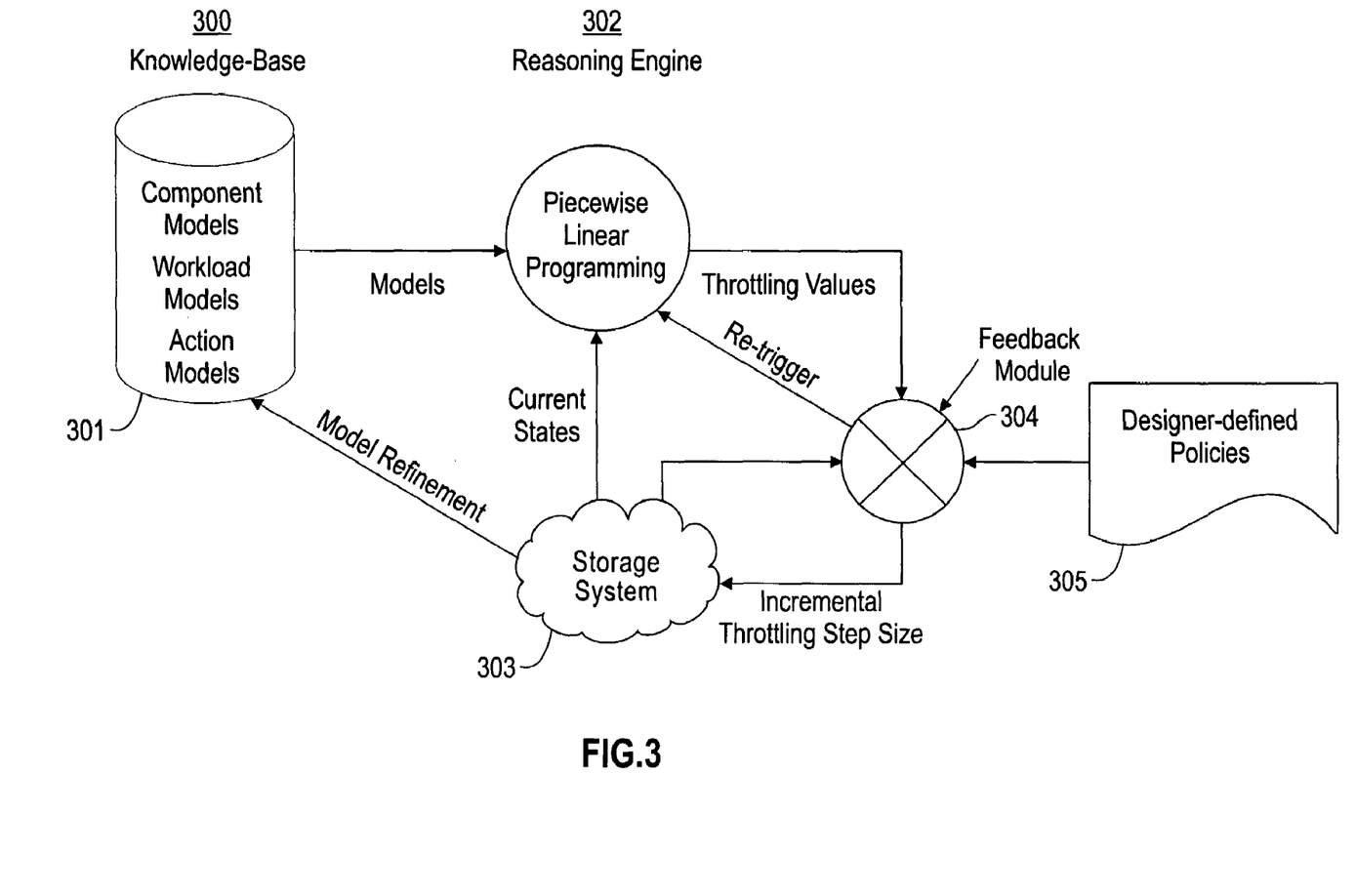
FIG. 3 is a computer architecture diagram-according to an embodiment herein.

The embodiments herein comprise a plurality of components, as shown in FIG. 3 and generally described below. Knowledge base component 300: by taking periodic performance samples on the running system 303, the embodiments build internal models of system behavior without any human supervision. Models 301 generate quantitative predictions of the behavior of subsystems as a function of some subset of their inputs. Examples include models that predict throughput, latency, or reliability as a function of the I/O workloads presented to the system 303. Models 301 make more accurate predictions as time goes by, for the embodiments refine them automatically. Reasoning engine 302: the embodiments employ optimization techniques, informed by the black-box models. The reasoning engine 302 computes throttle values for each workload in the system 303, and quantifies the statistical confidence on its own decisions. Designer-defined policies 305: as a fallback mechanism, the embodiments maintain a set of fixed heuristics specified by the system designer for system-independent, coarse-grained resource arbitration. Informed feedback module 304: the general guiding principle is to take radical corrective action as long as that is warranted by the available knowledge about the system 303. If the confidence value from the solver is below a certain threshold (e.g., during bootstrapping of the models), the embodiments fall back on designer-defined policies to make decisions.

With respect to the knowledge base, the embodiments herein build models in an automatic, unsupervised way. Models 301 are used to characterize the capabilities of components of the storage system 303, the workload being presented to them, and its expected response to different levels of throttling. Models based on simulation or emulation typically require a fairly detailed knowledge of the system's internal structure; analytical models require less device-specific knowledge, but optimizations and other policies must still be taken into account to obtain accurate predictions. Black-box models are built by pure observation; i.e., by recording and correlating inputs and outputs to the system in diverse states, without regarding its internal structure. Black-box models generally make very few assumptions about the phenomena being modeled, and can readily evolve when they change. The embodiments herein rely on black-box models as a preferred building block because they allow one to build an adaptive, deployment-independent management framework that does not depend on pre-existing model libraries.

Multiple techniques exist for building black-box models. Models in the embodiments herein are constructed using Support Vector Machines (SVM), a machine-learning technique for regression. This is similar to the well-known CART techniques for modeling storage device performance, where the response of the system is measured in different system states and represented as a best-fit curve function. Table-based models, where system states are exhaustively recorded in a table and used for interpolation, are generally not a viable building block for the embodiments herein, as they represent the model as a very large lookup table instead of the analytic expressions that the reasoning engine takes as input. At the same time, the black-box models used in the embodiments herein are generally less accurate than their analytical counterparts. However, the adaptive feedback loop provided by the embodiments herein compensates for that. Black-box models depend on collecting extensive amounts of performance samples. Some of those metrics can be monitored from client hosts, while others are tallied by components in the back end and collected via standard protocols such as SMI-S, or even via vendor-dependent interfaces for data collection.

A key challenge in ab-initio unsupervised model construction is bootstrapping; i.e., how to make decisions when models have not yet been refined to the point they become useful. There are several solutions for this: run tests in non-production mode to generate baseline models, or run in a monitor-only mode until models are sufficiently refined, or start from convenient oversimplifications (potentially contained in a library) such as an MM/1 queuing system. The embodiments herein follow different approaches for different model types.

Figure 4:
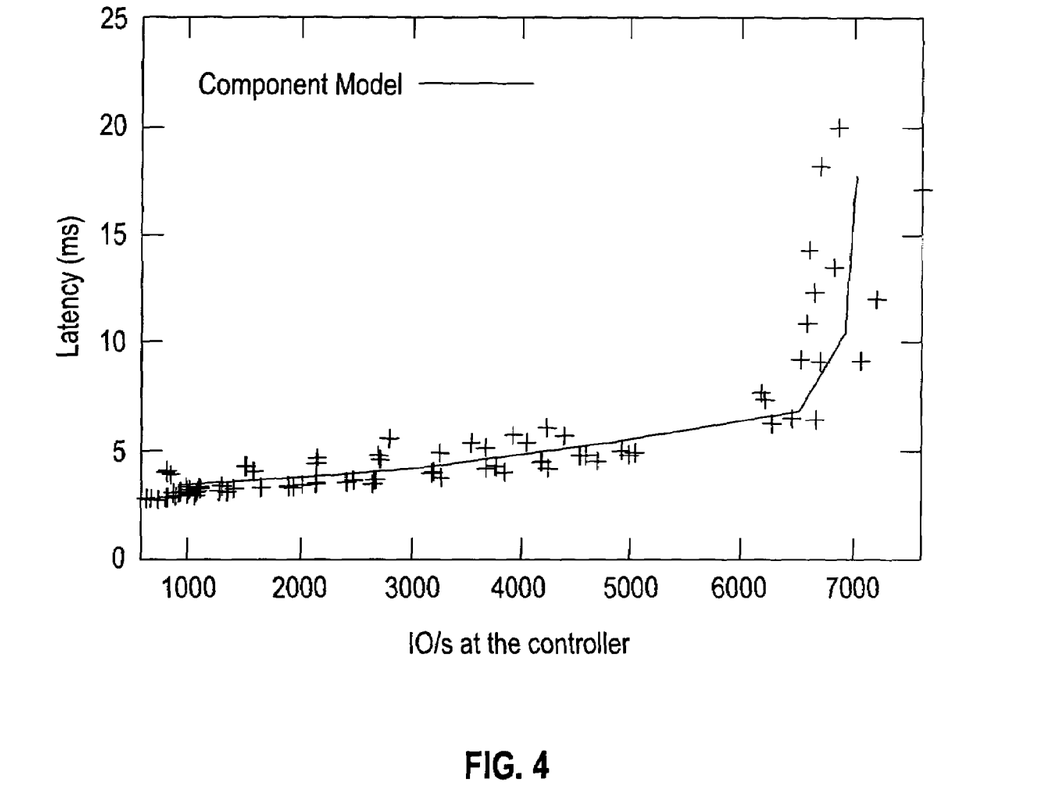
FIG. 4 is a graphical representation of a component model according to an embodiment herein.

A component model predicts values of a delivery metric, measured at some component of the storage system, as a function of the characteristics of the workload processed by that component. The embodiments herein can accommodate models for any system component. For example, the model for the response time of a storage device i can take the form: $c_i$ (req_size, req_rate, rw_ratio, random/sequential, cache_hit_rate). Function $c_i$ is non-linear, but can be approximated as piecewise linear; a projection of a sample $c_i$ is shown in FIG. 4. Another source of error is the effect of multiple workloads sending interleaved requests to the same component. The embodiments herein approximate this nontrivial computation by estimating the wait time for each individual stream as in a multi-class queuing model. The effects of caching at multiple levels (e.g., hosts, virtualization engines, disk array controllers, disks) also amplify errors. The embodiments herein bootstrap each component model by running off-line calibration tests against the component in question: a single, unchanging, synthetic I/O stream at a time, as part of a coarse traversal of $c_i$'s parameter space. It is typically impossible or impractical to train black-box models on all possible inputs. Therefore, even for systems whose behavior is completely deterministic, models will have prediction errors originating from two sources: the differences between observed data points and the value of the regression function at those points, and residuals-the unverified interpolations or extrapolations when models are used outside of the region(s) where they were trained.

Figure 5:
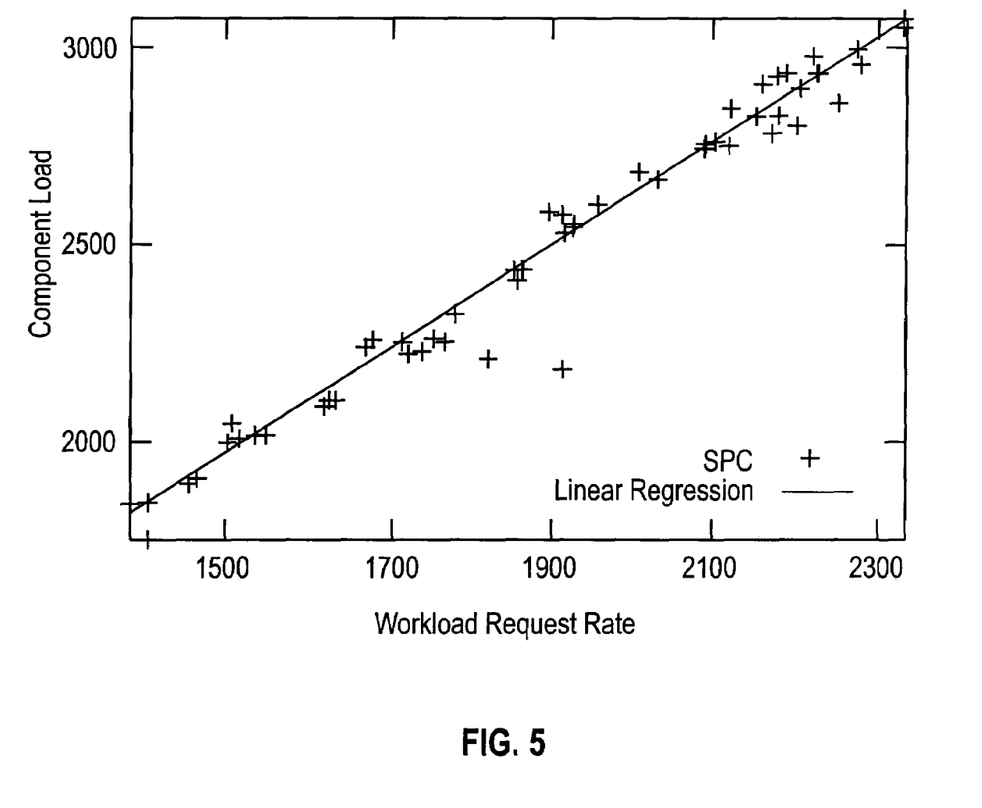
FIG. 5 is a graphical representation of a workload model according to an embodiment herein.

According to the embodiments herein, workload models predict the load on each component as a function of the request rate that each workload (running at client hosts) injects into the system. For example, the embodiments herein denote the predicted rate of requests at component i originated by workload j as $W_{ij}$ (workload_request_rate$_j$). In real world scenarios, function $w_{ij}$ changes continuously as workload j changes or other workloads change their access patterns (e.g., a workload with good temporal locality will push other workloads off the cache). To account for these effects, the embodiments herein represent function $W_{ij}$ as a moving average that gets recomputed by SVM every n sampling periods. FIG. 5 shows the workload models for the SPC web-search trace accessing a 24-drive RAID 1 LUN on an IBM FAStT 900 storage controller. From the graph, a workload request rate of 1500 IOPS in SPC translates to 2000 IOPS at the controller. In practical systems, reliable workload data can generally only be gathered from production runs. Accordingly, the embodiments herein bootstrap workload models by collecting performance observations from the running system. Moreover, the embodiments herein resort to throttling heuristics in the interim, until workload models become sufficiently accurate.

In general, action models predict the effect of corrective actions on workloads. The throttling action model computes each workload's average request rate as a function of the token issue rate; i.e., $a_j$ (token_issue_rate). Real workloads exhibit significant variations in their I/O request rates due to burstiness and to ON/OFF behaviors. The embodiments herein model a as a linear function: $a_j$ (token_issue_rate)=$\theta \times$ token_issue_rate$_j$ where $\theta$=1 initially for bootstrapping. This model assumes that the components in the workload's invocation path are not saturated. Function $a_j$ will, in general, also deviate from the linear model provided by the embodiments herein because of performance-aware applications (that modify their access patterns depending on the I/O performance they experience) and of higher-level dependencies between applications that propagate the effects of throttling.

The reasoning engine 302 computes the rate at which each workload stream should be allowed to issue I/Os to the storage system. It is implemented as a constraint solver (using piecewise linear programming) that analyzes all possible combinations of workload token issue rates and selects the one that optimizes an administrator-defined objective function; e.g., "minimize the number of workloads violating their SLA," or "ensure that highest priority workloads always meet their guarantees." Based on the errors associated with the models, the output of the constraint solver is assigned a confidence value.

Figure 6:
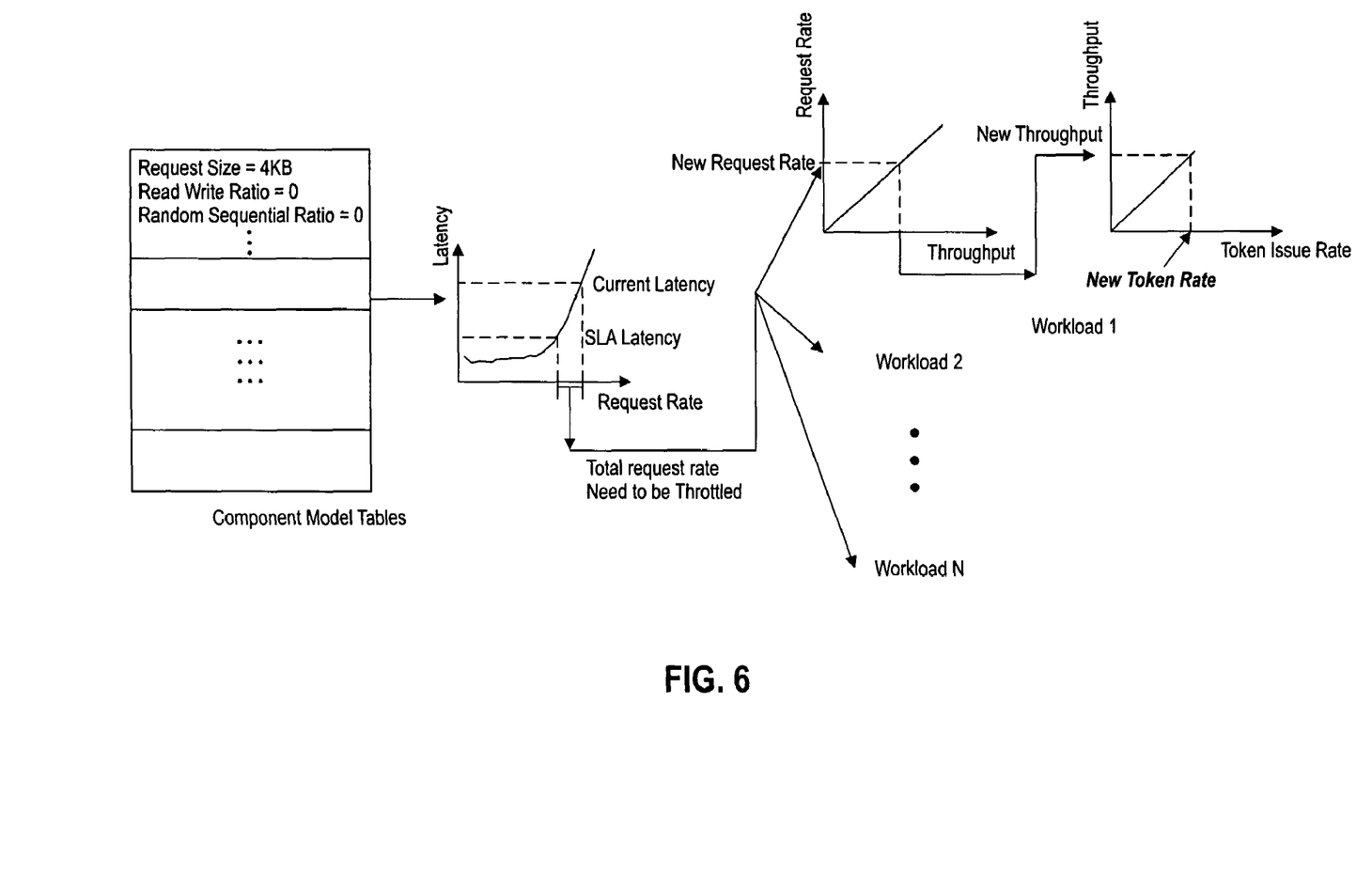
FIG. 6 is a schematic diagram illustrated constrained optimization according to an embodiment herein.

The reasoning engine relies on the component, workload, and action models as oracles on which to base its decision-making. FIG. 6 illustrates a simplified version of how the constraint solver builds a candidate solution: 1) for each component used by the underperforming workload (i.e., the one not meeting its SLA), use the component's model to determine the change in request rate at the component required to achieve the needed decrease in component latency; 2) query the model for each other workload using that component to determine which change in the workload's I/O injection rate is needed to relieve as much as necessary of the component's load; 3) using the action model, determine the change in the token issue rate needed for the sought change in injection rate; 4) record the value of the objective function for the candidate solution. Then repeat for all combinations of component, victim workload, and workload to be throttled. The reasoning engine is actually more general, wherein it works as if it considered all solutions, (including the ones in which the desired effect is achieved by the combined results of throttling more than one workload)-but prunes intelligently the irrelevant portions out of the search space.

Figure 7:
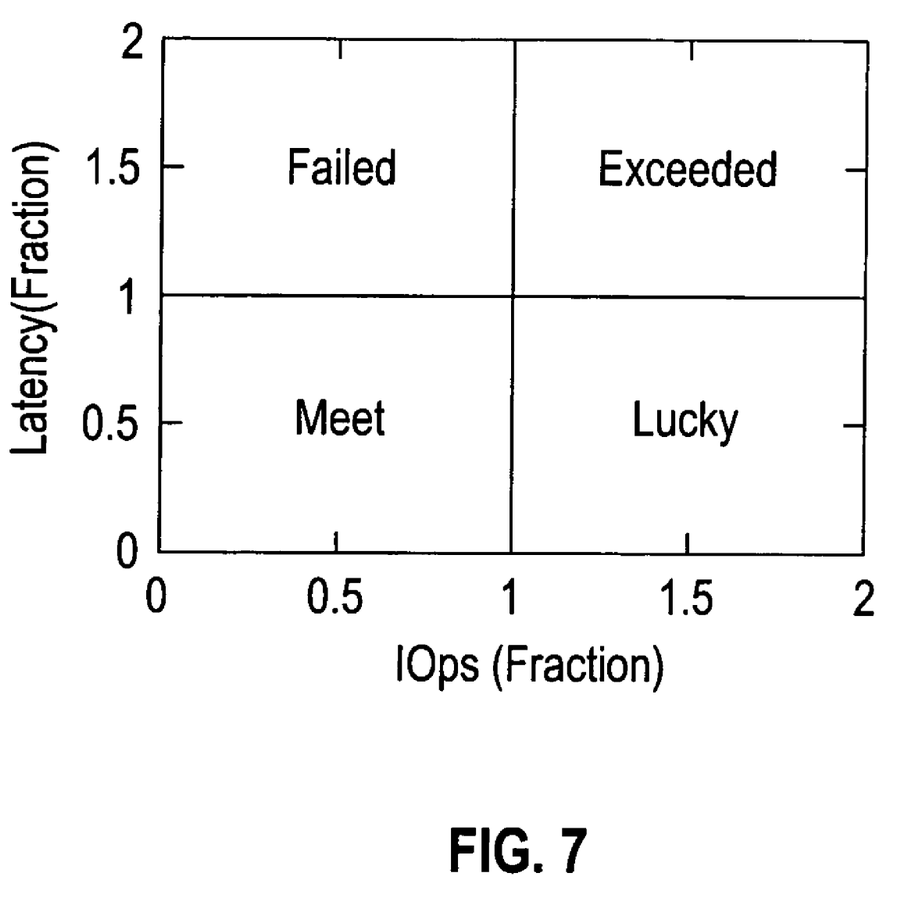
FIG. 7 is a graphical representation of the workload classifications according to an embodiment herein.

The embodiments herein formulate the task of computing throttle values in terms of variables, objective function, and constraints as follows. Variables: there is one per workload in this formulation, representing the workload's token issue rate: $t_1, t_2, \ldots$. Objective function: it is a quantitative assessment of the goodness of any state in which the system can be. At any given time, each workload is in one of four regions as depicted in FIG. 7, according to its current request rate, latency, and SLA goals. Region names are mostly self-explanatory; lucky workloads are getting a higher throughput while meeting the latency goal, and exceeded workloads get higher throughput at the expense of high latency. Many objective functions (e.g., all linear functions) can be accommodated by the embodiments herein. Moreover, it is possible to switch them while Chameleon is running, e.g., if organizational constraints require different management objectives. Similarly, workloads deemed more critical to the core function of the storage system should be given priority when they require more resources. To this end, Chameleon can handle additional inputs in the form of (relative) priorities, one for each workload. A workload with a given priority that is experiencing a SLA violation will have its needs satisfied before those of distressed workloads with lower priorities. For the experiments conducted to test the validity of the embodiments herein, the following function is minimized:

$$\sum_{i \notin failed} \left| P_{Quad_i} P_i \frac{SLA\_Thr_i - a_i(t_i)}{SLA\_Thr_i} \right|$$

where, for workload i that is not experiencing a SLA violation, $P_i$ is the workload's priority, $P_{Quad_i}$ is the priority of the quadrant where workload i currently is (i.e., a relative measure of the probability that workloads in the same quadrant will be selected as throttling candidates), $SLA\_Thr_i$ denotes the throughput limit for the workload as per its SLA, and $a_i(t_i)$ represents the action model for the workload (i.e., the estimated rate at which the workload is injecting I/Os into the system). Table 1 provides some insights into this particular choice.

TABLE 1

Intuition behind the objective function

| Intuition | How it is captured |
| --- | --- |
| The lower a workload's priority, the higher its probability of being throttled. | The solver minimizes the objective function; violating the SLA of a higher priority workload will result in $P_i \frac{SLA\_Thr_i - a_i(t_i)}{SLA\_Thr_i}$ having a greater value. |
| Workloads in the lucky or exceeded region have a higher probability of being throttled. | This is ensured by the $P_{Quad_i}$ variable in the objective function; it has higher values for lucky and exceeded (e.g., $P_{meet} = 1$, $P_{exceeded} = 8$, $P_{lucky} = 32$). It is also possible to define $P_{Quad_i}$ as a function of other inputs besides the quadrant id. |
| Workloads should operate close to the SLA boundary. | By definition of the objective function; it is also possible to add a bimodal function, to penalize workloads operating beyond their SLA. |

Constraints are represented as inequalities: the latency of a workload should preferably be less than or equal to the value specified in the SLA. More precisely, only solutions that satisfy $latency_j \leq SLA\_Lat_j$ for all workloads j running in the system are of interest. The embodiments herein estimate the contribution of component i to the latency of workload j by composing all three pertinent models in the knowledge base; i.e., $latency_{ij} = c_i(w_{ij}(a_j(t_j)))$. For example, the latency constraint for a single workload $W_1$ running in the system with its I/O requests being served by a storage controller followed by a given ensemble of physical disks is:

$c_{controller}(w_{controller,1}(a_1(t_1)))$ $+c_{disks}(w_{disks,1}(a_1(t_1))) \leq SLA\_Lat_1$ In a more general example, workloads $W_1$, $W_5$ share the storage controller:

$total\_req_{controller} = w_{controller,1}(a_1(t_1))$ $+w_{controller,5}(a_5(t_5));$ $total\_req_{disks} = w_{disks,1}(a_1(t_1))$ $+w_{disks,5}(a_5(t_5));$ $c_{controller}(total\_req_{controller})$ $+c_{disks}(total\_req_{disks}) \leq SLA\_Lat_1$ With respect to workload unthrottling, the embodiments herein invoke the reasoning engine periodically, to reassess token issue rates; if the load on the system has decreased since the last invocation, some workloads may be unthrottled to redistribute the unused resources based on workload priorities and average I/O rates. If a workload is consistently wasting tokens issued for it (because it has less significant needs), unused tokens will be considered for redistribution. On the other hand, if the workload is using all of its tokens, they will not be taken away no matter how low its priority is. The embodiments herein make unthrottling decisions using the same objective function with additional "lower-bound" constraints that prevent any I/O rate from becoming lower than its current average value.

There are multiple ways of capturing statistical confidence values. Accordingly, the embodiments herein use the following formula to capture both the errors from regression and from residuals:

$$S_p = S\sqrt{1 + \frac{1}{n} + \frac{(x_p - \bar{x})^2}{\sum x^2 - n\bar{x}^2}}$$

where S is the standard error, n is the number of points used for regression, and $\bar{x}$ is the mean value of the predictor variables used for regression. $S_p$ represents the standard deviation of the predicted value $y_p$ using input variable $x_p$. In the embodiments herein, the confidence value CV of a model is represented as the inverse of its $S_p$, and the overall confidence is defined on the reasoning engine's decisions as $CV_{component} \times CV_{workload} \times CV_{action}$.

The system designer defines policies (which are actually heuristics) for coarse-grained throttling control. Heuristics are used to make decisions whenever the predictions of the models cannot be relied upon; either during bootstrapping or after significant system changes such as hardware failures. Sample heuristics include "if system utilization is greater than 85%, start throttling workloads in the lucky region," or "if the workload-priority variance of all workloads sharing a component is less than 10%, uniformly throttle all of them."

These heuristics can be expressed in a variety of ways such as Event-Condition-Action (ECA) rules or hard-wired, non-evolving code. In the embodiments herein, designer-defined heuristics are implemented as simple hard-wired code which is a modified version of the throttling algorithm described by Chambliss et al. in "Performance virtualization for large-scale storage systems," in the Proceedings of the $22^{nd}$ Symposium on Reliable Distributed Systems, pages 109-118, October 2003, the complete disclosure of which in its entirety is herein incorporated by reference.

In more detail, designer-defined policies in the embodiments herein: (1) determine the compList of components being used by the underperforming workload; (2) for each component in the compList, add the non-underperforming workloads using that component to the candidateList; (3) sort the candidateList first by the current operating quadrant: lucky first, then exceeded, then meet; within each quadrant, sort by workload priority; and (4) traverse the candidateList and throttle each workload, either uniformly or proportionally to its priority (the higher the priority, the less significant the throttling).

Figure 8:
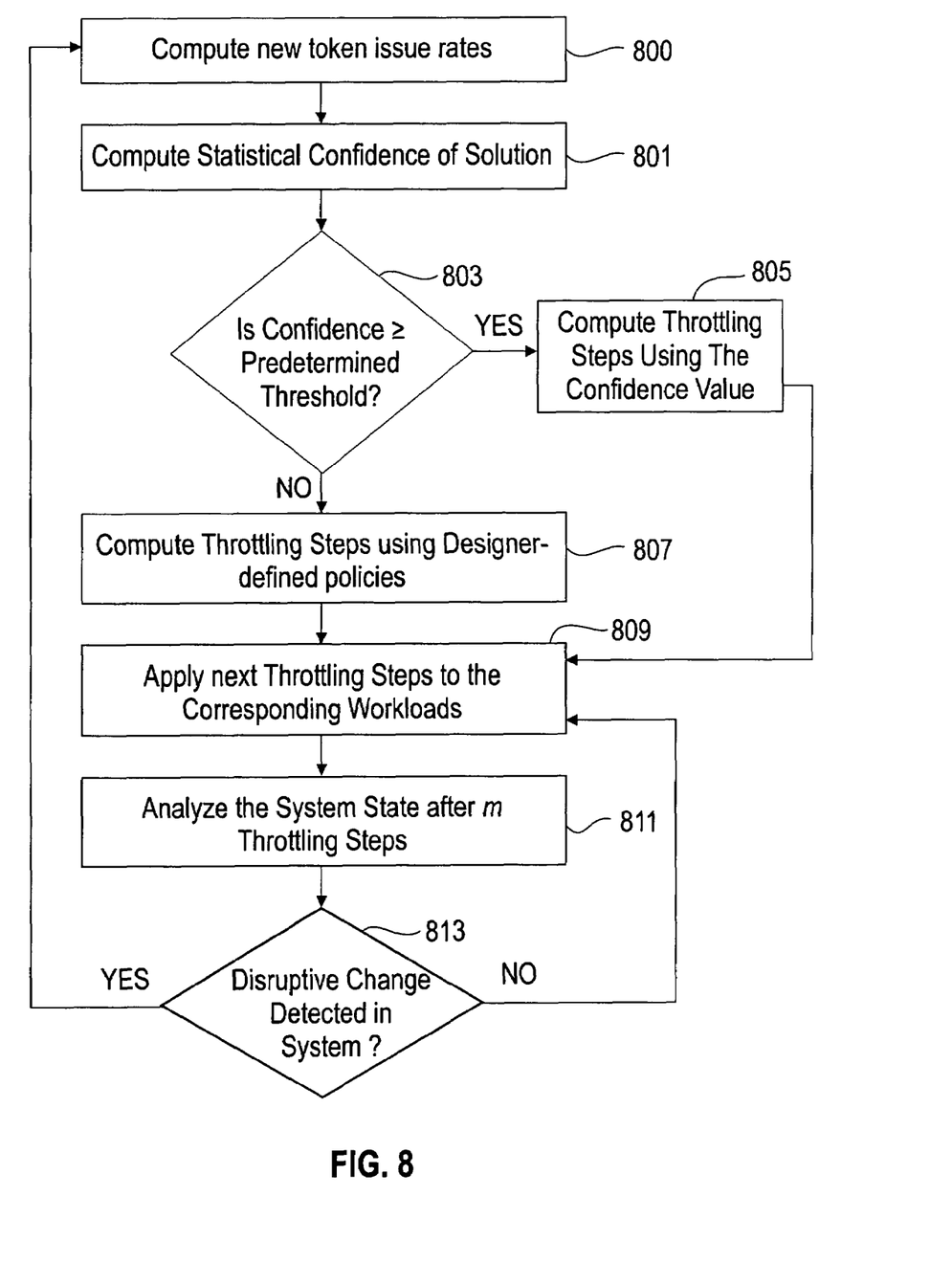
FIG. 8 is a schematic diagram illustrating the operation of the feedback module according to an embodiment herein.

The operation of the feedback module 304 is described in FIG. 8. The reasoning engine 302 (of FIG. 3) computes a resource allocation (i.e., a set of throttling values for a subset of the workloads) in step 800 with the goal of increasing the value of the objective function, and the reasoning engine 302 (of FIG. 3) also computes the numeric confidence on the proposed resource allocation in step 801. If the reasoning engine based its decisions in models 301 (of FIG. 3) that were sufficiently accurate at the time (decision step 803), step 805 computes the throttling step size based on the confidence value (bigger confidence values result in bigger, more aggressive throttling steps). More specifically, the throttling step (expressed as the fraction of the ultimate, desired throttling correction that must be applied as per the computed resource allocation) may be set to CV×Throttling_step_damper, where Throttling_step_damper is a predetermined constant set in accordance to the predetermined confidence threshold to ensure that the throttling step will be in the required range (0,1]. If test 803 concludes that the confidence on the proposed allocation is not sufficiently high, the system falls back on the designer-defined policies that compute the throttling step size in step 807. In addition to determining which workloads should be throttled, designer-defined policies may also determine the size of the throttling step; e.g., using simple policies such as choosing a constant fraction or even a constant number of IOPS. The feedback module then applies in step 809 a few (for example, two) steps of the throttlings thus computed.

Periodically, after a fixed number of throttling steps the feedback module analyzes the state of the system in step 811 to determine if any of the following conditions is true: if latency increased for the underperforming workload (i.e., it moved away from the meet region); OR if a non-underperforming workload moved from meet or exceed to lucky; OR if any workload underwent a two times or greater variation in the request rate or any other access characteristic, compared to the values at the beginning of throttling; OR if there is a two times or greater difference between predicted and observed response times for any component. If any of those conditions is true, the state of the system is deemed to have changed enough (between the present time and the past time at which throttling decisions were last made) to warrant a reconsideration of the throttling decisions; decision step 813 re-invokes the reasoning engine 302 (of FIG. 3) and the process begins again.

The embodiments herein provide an ideal solution for resource arbitration in shared storage systems that adapts to changing workloads, client requirements and system conditions. The embodiments herein also relieve system administrators from the burden of having to specify when to step in and take corrective action, and what actions to take; thus allowing them to concentrate on specifying the global objectives that maximize the storage utility's business benefit, and having the system take care of the details. Generally, the conventional solutions do not satisfy these criteria; prior approaches are typically either inflexible, or require administrators to supply upfront knowledge that is not available to them.

The embodiments herein identify which client workloads should be throttled based on constrained optimization. Constraints are derived from the running system, by monitoring its delivered performance as a function of the demands placed on it during normal operation. The objective function being optimized can be defined, and changed, by the administrator as a function of organizational goals. Given that the actions prescribed by the reasoning engine provided by the embodiments herein are only as good as the quality of the models used to compute them, the embodiments herein switch to a conservative decision-making process if insufficient knowledge is available. The embodiments herein's approach to model building requires no prior knowledge about the quantitative characteristics of workloads and devices, and make good decisions in realistic scenarios such as those involving workloads with relative priorities.

The embodiments herein provide an adaptive arbitrator for shared storage resources, wherein they rely on a combination of self-refining models and constrained optimization to provide performance guarantees to clients. The process provided by the embodiments herein depends on minimal information from clients, and is fully adaptive, wherein decisions are based on device and workload models automatically inferred, and continuously refined, at runtime. Corrective actions taken by the embodiments herein are only as radical as warranted by the current degree of knowledge about the system's behavior.

Figure 9:
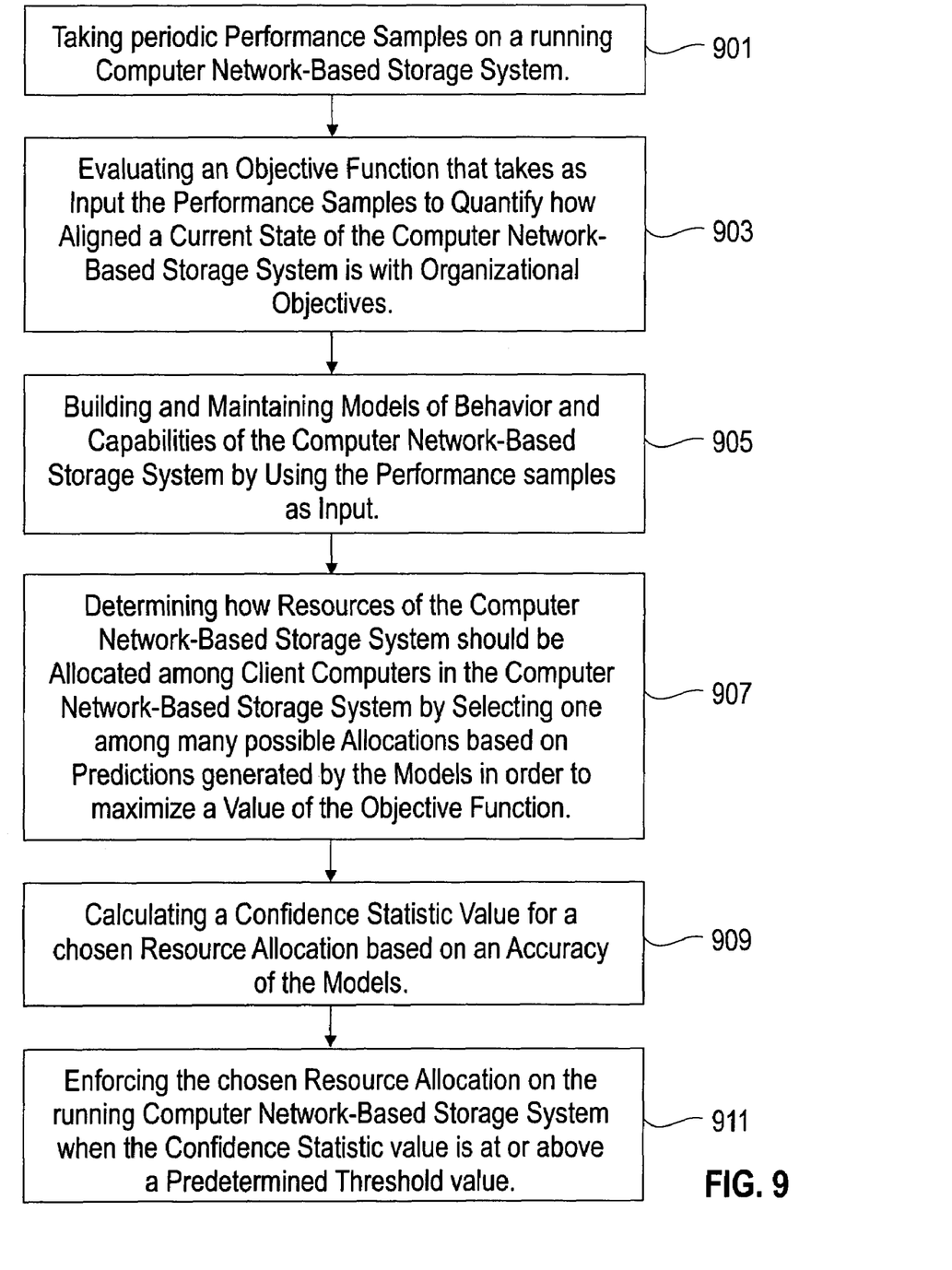
FIG. 9 is a flow diagram illustrating a preferred method according to an embodiment herein.

FIG. 9 illustrates a flow diagram of a computer-implemented method of allocating shared resources in a computer network-based storage system, wherein the method comprises taking (901) periodic performance samples on a running computer network-based storage system; evaluating (903) an objective function that takes as input the performance samples to quantify how aligned a current state of the computer network-based storage system is with organizational objectives; building and maintaining (905) models of behavior and capabilities of the computer network-based storage system by using the performance samples as input; determining (907) how resources of the computer network-based storage system should be allocated among client computers in the computer network-based storage system by selecting one among many possible allocations based on predictions generated by the models in order to maximize a value of the objective function; calculating (909) a confidence statistic value for a chosen resource allocation based on an accuracy of the models; and enforcing (911) the chosen resource allocation on the running computer network-based storage system when the confidence statistic value is at or above a predetermined threshold value.

The embodiments herein can take the form of an entirely hardware embodiment, an entirely software embodiment or an embodiment including both hardware and software elements. A preferred embodiment is implemented in software, which includes but is not limited to firmware, resident software, microcode, etc.

Furthermore, the embodiments herein can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 10:
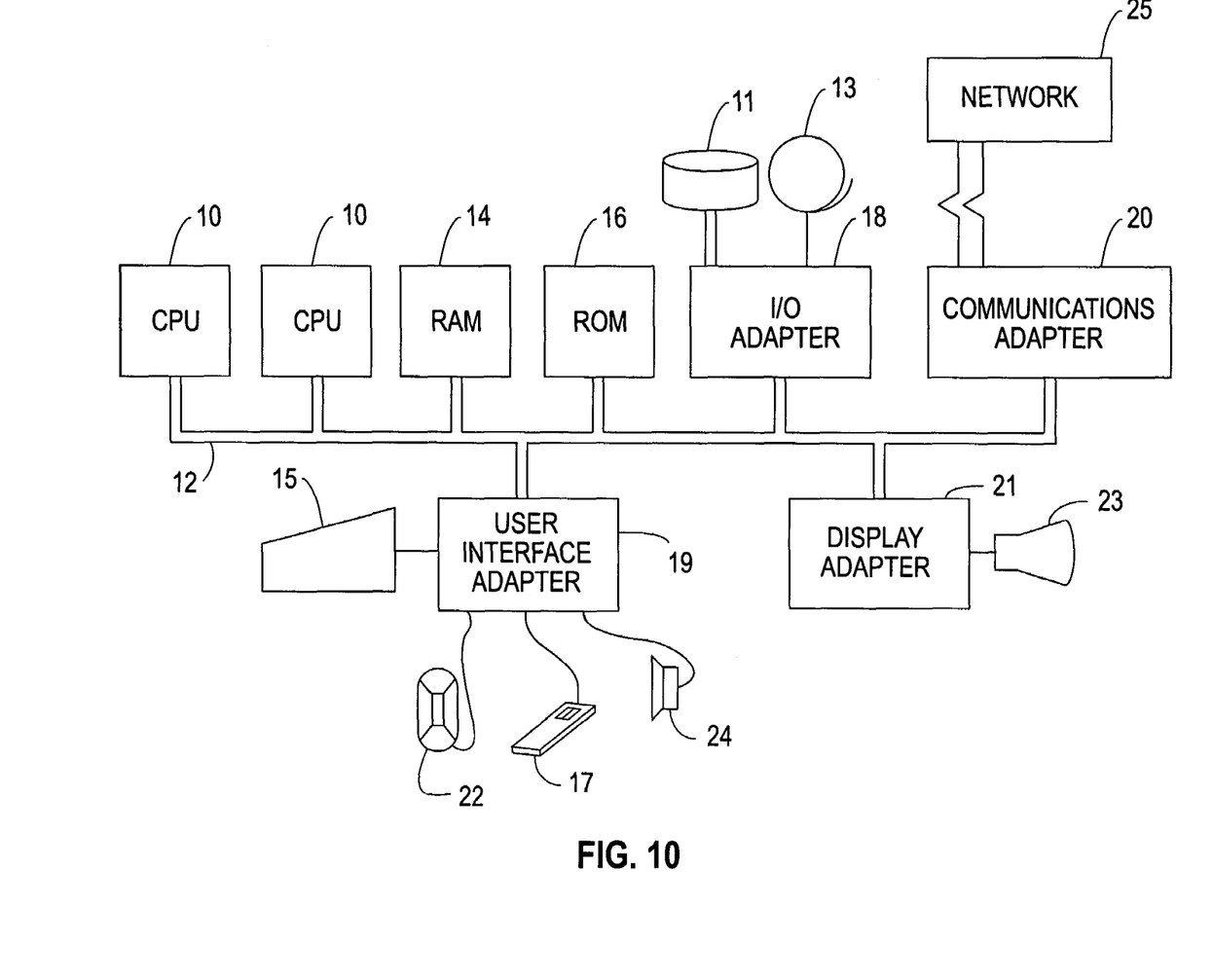
FIG. 10 is a computer system diagram according to an embodiment herein.

A representative hardware environment for practicing the embodiments herein is depicted in FIG. 10. This schematic drawing illustrates a hardware configuration of an information handling/computer system in accordance with the embodiments herein. The system comprises at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments herein. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A computer-implemented method of allocating shared resources in a computer network-based storage system, said method comprising:
    taking, using a computer, periodic performance samples on a component of a plurality of components comprising said computer network-based storage system, said computer network-based storage system running an underperforming workload, and each of said periodic performance samples including a component average latency and a component I/O request rate for said component,
    wherein said underperforming workload is characterized by exceeding an upper bound on an average latency for a workload, specified by a Service Level Agreement (SLA), when said underperforming workload's request rate does not exceed an I/O request rate, also specified by said SLA;
    evaluating, using said computer, a set of functions of said computer network-based storage system using said periodic performance samples as input, said models comprising:
        a component function for said component that predicts said component average latency based on other workloads running on said component;
        a workload function for said component that predicts a load on said component based on I/O request rates of said other workloads; and
        an action function for said component that predicts an effect of a throttling action on each other workload's I/O request rate;
    quantitatively optimizing, using said computer, a second function for said underperforming workload and each of said other workloads that predicts a current I/O request rate and a current average latency for each component of said plurality of components, based on said effect of said throttling action on said each other workloads' I/O request rate; and
    throttling, using said computer, one or more of said other workload's request rates, based on said quantitatively optimizing said second function, to free components of said computer network-based storage system, such that, said underperforming workload is transformed into a workload that satisfies said SLA.

2. The method of claim 1, further comprising:
    calculating, using said computer, a confidence statistic value for allocating said shared resources based on an accuracy of said set of functions;
    maintaining, using said computer, a predetermined set of system designer-defined policies for allocating said shared resources; and
    using said set of system designer-defined policies, using said computer, so long as said confidence statistic value is less than a predetermined threshold value.

3. The method of claim 2, wherein said SLA of a plurality of SLAs is associated with a client computer on said computer network-based storage system, and wherein a value of said second function depends on a particular SLA being violated.

4. The method of claim 3, wherein said client computer is assigned a priority such that said second function incorporates said priority to prefer an allocation of said shared resources in which said SLA of said client computer with a higher priority is satisfied.

5. The method of claim 4, wherein said performance samples improve an accuracy of said first set of functions, based on said confidence statistic value, in a periodic and fully-automatic manner and determine when variable system conditions have caused a discontinuous change in a behavior of said computer network-based storage system.

6. The method of claim 5, wherein incremental model refinement is accomplished, using said computer, starting from any of:
- a function built by taking performance samples from said computer network-based storage system in a non-production use;
- a function built by taking performance samples from said computer network-based storage system in a production use while the first set of functions are not being used to allocate resources; and
- a simplified representation of said behavior of said computer network-based storage system.

7. The method of claim 4, wherein said allocation of shared resources among competing client computers is made by solving a constrained optimization problem.

8. The method of claim 1, wherein transforming said underperforming workload to said workload that satisfies said SLA comprises issuing tokens to said one or more other workloads, which are throttled, corresponding to additional I/Os to a backend.

9. The method of claim 8, wherein transitions between current workload token issue rates and lower token issue rates are enforced progressively in steps whose size depends on said confidence statistical value.

10. The method of claim 9, further comprising reassessing, using said computer, token issue rates depending on a change in said current workload of said component.

11. The method of claim 10, further comprising, using said computer, analyzing a current state of performance of said computer network system after a predetermined number of throttling steps.

12. The method of claim 11, wherein token issue rates for one or more said client computers unthrottle their workloads when resources are available.

13. A program storage medium readable by a computer, tangibly embodying a program of instructions executable by said computer to perform computer-implemented method of allocating shared resources in a computer network-based storage system, said method comprising:
- taking periodic performance samples on a component of a plurality of components comprising said computer network-based storage system, said computer network-based storage system running an underperforming workload, and each of said periodic performance samples including a component average latency and a component I/O request rate for said component,
- wherein said underperforming workload is characterized by exceeding an upper bound on an average latency for a workload, specified by a Service Level Agreement (SLA), when said underperforming workload's request rate does not exceed an I/O request rate, also specified by said SLA;
- evaluating a set of functions of said computer network-based storage system using said periodic performance samples as input, said set of functions comprising:
  - a component function for said component that predicts said component average latency based on other workloads running on said component;
  - a workload function for said component that predicts a load on said component based on I/O request rates of said other workloads; and
  - an action function for said component that predicts an effect of a throttling action on each other workload's I/O request rate;
- quantitatively optimizing a second function for said underperforming workload and each of said other workloads that predicts a current I/O request rate and a current average latency for each component of said plurality of components, based on said effect of said throttling action on said each other workloads' I/O request rate
- throttling one or more of said other workload's request rates, based on said quantitatively optimizing said second function, to free components of said computer network-based storage system, such that, said underperforming workload is transformed into a workload that satisfies said SLA.

14. The program storage medium of claim 13, wherein said method further comprises:
- calculating a confidence statistic value for said allocation of resources based on an accuracy of said set of models;
- maintaining a predetermined set of system designer-defined policies for said allocation of shared resources; and
- using said set of system designer-defined policies so long as said confidence statistic value is less than said predetermined threshold value.

15. The program storage medium of claim 14, wherein said SLA of a plurality of SLAs is associated with a client computer on said computer network-based storage system, and wherein a value of said second function depends on a particular SLA being violated.

16. The program storage medium of claim 15, wherein said client computer is assigned a priority such that said second function incorporates said priority to prefer an allocation of said shared resources in which said SLA of said client computer with a higher priority is satisfied.

17. The program storage medium of claim 16, wherein said performance samples improve an accuracy of said models, based on said confidence statistic value, in a periodic and fully-automatic manner and determine when variable system conditions have caused a discontinuous change in a behavior of said computer network-based storage system.

18. The program storage medium of claim 17, wherein incremental function refinement is accomplished using any of:
- a function built by taking performance samples from said computer network-based storage system in a non-production use;
- a function built by taking performance samples from said computer network-based storage system in a production use while models are not being used to allocate resources; and
- a simplified representation of said behavior of said computer network-based storage system.

19. The program storage medium of claim 16, wherein said allocation of shared resources among competing client computers is made by solving a constrained optimization problem.

20. The program storage medium of claim 13, wherein transforming said underperforming workload to said workload that satisfies said SLA comprises issuing tokens to said one or more other workloads, which are throttled, corresponding to additional I/Os to a backend.

21. The program storage medium of claim 20, wherein transitions between current workload token issue rates and lower token issue rates are enforced progressively in steps whose size depends on said confidence statistical value.

22. The program storage medium of claim 21, wherein said method further comprises reassessing token issue rates depending on a change in said current workload of said component.

23. The program storage medium of claim 22, wherein said method further comprises analyzing a current state of performance of said computer network system after a predetermined number of throttling steps.

24. The program storage medium of claim 23, wherein token issue rates for one or more said client computers unthrottle their workloads when resources are available.

25. A computer-implemented system for allocating shared resources in a computer network-based storage system comprising:
 a processor for taking periodic performance samples on a component of a plurality of components comprising said computer network-based storage system, said computer network-based storage system running an underperforming workload, and each of said periodic performance samples including a component average latency and a component I/O request rate for said component,
 wherein said underperforming workload is characterized by exceeding an upper bound on an average latency for a workload, specified by a Service Level Agreement (SLA), when said underperforming workload's request rate does not exceed an I/O request rate, also specified by said SLA;
 a processor for evaluating a set of functions of said computer network-based storage system using said periodic performance samples as input, said set of functions comprising:
  a component function for said component that predicts said component average latency based on other workloads;
  a workload function for said component that predicts a load on said component based on I/O request rates of said other workloads; and
  an action function for said component that predicts an effect of a throttling action on each other workload's I/O request rate;
 quantitatively optimizing a second function for said underperforming workload and each of said other workloads that predicts a current I/O request rate and a current average latency for each component of said plurality of components, based on said effect of said throttling action on said each other workloads' I/O request rate
 throttling one or more of said other workload's request rates, based on said quantitatively optimizing said second function, to free components of said computer network-based storage system, such that, said underperforming workload is transformed into a workload that satisfies said SLA.

* * * * *